United States Patent [19]

Capps

[11] Patent Number: 5,366,594
[45] Date of Patent: Nov. 22, 1994

[54] PROCESS OF FORMING A CELLULOSE PRODUCT HAVING A HIGH CONTENT OF SILICATE CROSS-LINKED CELLULOSE POLYMER

[75] Inventor: Charles Capps, Little Rock, Ark.

[73] Assignee: Biofoam Industries, Inc., Little Rock, Ark.

[21] Appl. No.: 877,752

[22] Filed: May 4, 1992

Related U.S. Application Data

[60] Division of Ser. No. 421,094, Oct. 13, 1989, Pat. No. 5,133,834, which is a continuation-in-part of Ser. No. 268,747, Nov. 8, 1988, abandoned.

[51] Int. Cl.$^5$ .................................................. D21C 3/06
[52] U.S. Cl. ............................................ 162/84; 162/97
[58] Field of Search .................. 162/100, 101, 91, 99, 162/97, 83, 148, 84; 264/DIG. 5, DIG. 63; 127/37, 39, 43, 44, 34

[56] References Cited

U.S. PATENT DOCUMENTS

| | | | |
|---|---|---|---|
| 1,848,661 | 3/1932 | Richter | 162/84 |
| 2,962,413 | 11/1960 | Hatheway | 162/99 |
| 3,025,222 | 3/1962 | Thomsen | 127/37 |

*Primary Examiner*—Steve Alvo
*Attorney, Agent, or Firm*—Jack A. Kanz

[57] ABSTRACT

Plant wastes such as rice hulls which are high in cellulose and silica are converted into a slurry of water and a silicate cross-linked cellulose poller by digestion under heat and pressure in the presence of sodium ions and a sulfite. The slurry is treated with conventional foaming agents to form a foamed product expanded in volume which may be formed into any desired shape or size by extrusion, molding or casting. The composition of the product of the conversion process is represented by the formula $C_7H_{12}O_7(OCH_{3.2}NaHSiO_3)$.

6 Claims, No Drawings

PROCESS OF FORMING A CELLULOSE PRODUCT HAVING A HIGH CONTENT OF SILICATE CROSS-LINKED CELLULOSE POLYMER

This is a division of application Ser. No. 07/421,094 filed Oct. 13, 1989, now U.S. Pat. No. 5,133,834, which is a continuation-in-part of application Ser. No. 07/268,747 filed Nov. 8, 1988, now abandoned.

This invention relates to processes for converting waste plant material to products suitable for making lightweight expanded cellular products such as loose-fill formed body packaging, insulation material, filtration materials and the like and for making coating films, non-woven fibrous material and the like. More particularly, it relates to processes for extracting and altering cellulose from silica-rich plant wastes such as rice hulls and the like and for converting the cellulose product into end products having a wide variety of uses.

Many waste products are created during growth, harvesting and manufacturing products from agricultural crops. For example, in the production of grain products such as wheat, corn, rice, barley, oats and the like large amounts of stalks and hulls are produced which are separated from the grain product as waste. Some such waste products are used for fertilizers, fillers, plant foods and animal foods. However, some of the waste products are produced in such large quantities and have such low nutrient value that they have no value in the waste product form and, in fact, present a nuisance and disposal problem. Rice hulls and stalks are typical of such products and are produced in such great volumes that most are disposed of in the most expeditious and least costly manner available. In most cases the rice hulls are simply burned. Burning, however, is costly and produces unacceptable byproducts such as smoke and ash.

Rice hulls and stalks are unique among agricultural plant product wastes in several respects. For example, rice hulls and stalks typically contain about sixty-five percent (65%) to about seventy-five percent (75%) cellulose; about ten percent (10%) lignins; and about twenty percent (20%) silica. In the present invention the natural plant composition is physically and chemically altered to produce a polymeric product suitable for a wide variety of uses. Unlike the many synthetically produced polymers, most of which are derived from petroleum-based products, the product of this invention is biodegradable and can fulfill many of the current uses of petroleum-based synthetics without the associated toxicity and non-degradable characteristics of such products.

It is well known that products formed into lightweight bodies containing chained cellular lenses provide excellent cushioning when used as packing materials. Such products also exhibit excellent thermal insulation characteristics since trapped cells of gas act as thermal barriers and such products are sufficiently lightweight to provide an acceptable weight penalty for insulated containers. Typically, such packaging and insulating materials are made by expanding synthetic polymers such as polystyrene, polyethylene and the like. While these products have long been used as packing and insulating materials and have all the qualities and characteristics desired, they are primarily petroleum products. Therefore, as the world supply of recoverable petroleum products decreases and the energy demand for petroleum products increases, the cost of petroleum-based products increases. Furthermore, petroleum-based products are generally not biodegradable, thus form an ecology hazard. Even when burned, many such products produce hazardous or toxic byproducts and often liberate gasses such as fluorocarbons which are hazardous to the environment. Ultimately, alternate materials must be developed for use as inexpensive biodegradable non-toxic and non-hazardous packing and insulating materials. The present invention is particularly directed toward achieving this goal.

In accordance with the present invention, waste products of plant origin are converted to cellulose product which may be converted into packing and packaging materials, insulative materials, coating materials, filtration materials and other non-woven products. In the preferred embodiment the particular plant material used is rice hulls. As noted above, rice hulls are an extremely plentiful byproduct of agricultural rice production and are produced in such quantities as to present a disposal problem. Therefore the major raw material used in the process is, at present, essentially free of production cost. Furthermore, the process steps, the processing equipment and other raw materials used in the process of the invention are readily available or can readily be made available by modification of existing equipment and processes used in unrelated fields.

In accordance with the present invention, silica-rich plant wastes such as rice hulls and/or stalks are converted into pulp in a digestion process somewhat similar to that used for making wood pulp in paper-making processes. The pulp slurry is chemically altered, however, to produce a cellulose product with unique polymeric characteristics. The resulting slurry may then be foamed and solidified to produce a lightweight homogenous cellular product similar in physical appearance and characteristics to expanded polystyrene foam. However, because of the unique polymeric characteristics of the cellulose product, it may be used in an unexpanded state to produce a wide variety of other useful end products such as films, protective coatings, etc.

In the preferred practice of the invention raw rice hulls are used as the primary raw material source. However, rice stalks, suitably comminuted, may be used as well or in combination with hulls. Accordingly, the term "rice hulls" as used herein will be understood to include rice stalks as well as hulls. Similarly, any other plant product which contains suitable concentrations of cellulose and silica may be used in place of rice hulls.

In the preferred method of practicing the invention rice hulls (or other suitable plant materials) are digested in a two-stage sulfite-acid bisulfite cook digestion process. The process preferred is a modification of the processes known as the Stora method and the Billerud method used to make wood pulp for the paper industry. While the process described in detail is primarily a batch process, it will be readily recognized that in a manufacturing environment production economics and quality control may dictate a continuous process. Such a continuous process could be readily performed by suitably monitoring and adjusting pH values through the digesting process without altering the desired end result. For convenience of disclosure, a batch process employing a two-stage cook procedure will be described in detail.

In making rice hull pulp, a dry charge of known weight of rice hulls is placed in an enclosed digester vessel. A liquor of about twenty percent (20%) sodium sulfite in water is added to the digester until the pH of the solution is approximately pH6 to pH8 and the mass is heated to about 140° C. Pressure is maintained in the digester at about seventy (70) to about one hundred fifty (150) psia. Obviously, lower pressures and temperatures may be employed but longer cooking times will be required. Likewise, higher pressures and temperatures will result in shorter cooking times. Using a cooking temperature of about 140° C. with pressures maintained at about seventy (70) to about one hundred fifty (150) psia, initial digestion is accomplished in about three (3) hours. The initial digestion process breaks the rice hull material into its basic cellular components of cellulose, lignins and silica. Pressure is then relieved and the liquor pH readjusted to bring the pH of the mass to about pH6 to about pH8 using a twenty percent (20%) solution of sodium bisulfite. A one percent (1%) solution of sulfuric acid is then added to bring the pH of the mass to about pH3. The mass is then reheated to the original pressure and temperature for approximately three (3) hours.

During the second cooking process hydrolysis occurs to produce polysaccharides and glucosidics in forms which provide pure cellulose. However, the product resulting from the digestion process is a slurry of pulp with an extremely high content of cellulose and silica in which the cellulose appears to have been thermochemically altered to form a pelymeric molecular arrangement cross-linked with silica. Without being bound by any theory, it is believed that an ionic silicate bonding is achieved with the cellulose which supplements molecular chaining and produces cross-linking of the cellulose molecules, thus altering the properties of the cellulose. Chemical and physical analysis indicates that the slurry is primarily a water solution of a silicate cross-linked cellulose polymer having a molecular composition represented by the formula $C_7H_{12}O_7(OCH_{3}.2NaHSiO_3)$. In any event, the thermochemical treatment produces a cellulose product which exhibits physical characteristics unlike that of pure cellulose. For example, substantial differences in properties of the cellulose product of the invention and natural cellulose are noted in absorption of water, cushioning, bonding tenacity, modulus of elasticity and thermal stability.

For cosmetic purposes, bleaching processes typical of those used in the paper-making industry may be used to effectively brighten the slurry without causing deleterious effects. The pulp may be bleached by rinsing with typical bleaching agents such as a water solution of magnesium sulfate, sodium silicate, hydrogen peroxide or the like. The bleaching steps, however, are primarily for cosmetic purposes and can be eliminated without affecting the process or the unique characteristics of the final product.

The resultant rice pulp comprises a wet pulp mass in the form of a thick slurry. This slurry may be formed into large or small bodies of expanded product by foaming with a suitable foaming agent or by frothing and application of heat to reduce the moisture content for solidification. Foaming agents as used to expand polystyrene have been found generally acceptable. For example, the foamed product may be formed by introduction from an external source of an inert gas such as nitrogen, carbon dioxide or the like in the presence of heat. The foamed product may be cast, molded or extruded at a temperature of about 130° C. for solidification into a rigid mass. Higher baking temperatures, of course, tend to drive off more water and result in a more brittle mass.

The cellulose slurry product can also be expanded chemically. For example, when the pulp slurry is mixed with a solution of sodium sulfite, sodium aluminum sulfate, calcium carbonate and phosphoric acid, carbon dioxide (as well as other gasses) is liberated which foams the product. Such foaming agents react autogeneously within the slurry to form cells of trapped gas. The final product is an expanded cellular rigid body which is self-supporting but frangible and somewhat flexible. The gas cells can be ruptured during subsequent heating, permitting the trapped gas and any water vapor to escape. The resulting product is thus quite porous and has an extremely low density but exhibits structural physical characteristics very similar to foamed polystyrene.

Since the chemical foaming reaction is usually exothermic, the final product may simply be air dried and be ready for use. If desired, the final product may be externally heated sufficiently to drive off excess water. Heating may also expedite solidification of the formed material. Regardless of the expansion method used, the resulting product is quite porous with a low density directly related to the physical introduction of gas in the foaming process. Densities as low as 2.4 pounds per cubic foot have been achieved.

During the chemical foaming process or gas insertion foaming process the product may be extruded using conventional techniques to form continuous lengths or small individual bodies of expanded product. Likewise, the slurry can be cast or molded to form shaped bodies as desired.

Because of the unusual qualities of the polymeric slurry product, it may be applied by spraying, dipping or the like to form an adherent film of coating having characteristics similar to conventional acrylic compounds. Similarly, the polymeric product may be extruded into thin continuous films for use in packaging and moisture barrier applications and the like. The polymeric product may even be sprayed or otherwise applied to form thin films on paper products to provide paper products with unusual properties such as water-resistance, tear resistance, etc.

Rice hulls provide a heretofore unrecognized plentiful and inexpensive source of readily available cellulose. Because of its high cellulose content, it can be economically digested as described hereinabove to produce compositions low in lignins but high in polysaccharides and glucose in the form of cellulose. Because of the high cellulose content of rice hulls, the lignins need not be removed prior to forming a foamed product. However, other components of the raw material separated by the digestion process may be removed, if desired, to yield an inexpensive source of pure cellulose for various other applications.

It will be recognized that the product of the digestion process is essentially a cellulose product with a relatively high silica content. Therefore, it is quite stable but not chemically inert and thus is biodegradable. It will also be recognized that acceptable insecticides, pesticides, fungicides and the like may be incorporated into the polymeric slurry to produce products having desired biological protection and preservative characteristics. Such additives may also besprayed or otherwise added to the external surface of the final product to form protective coatings. Likewise, hydrophobic coatings may be applied to the final product to protect against moisture absorption. However, since the basic product is cellulose, it remains biodegradable in landfill disposal and may even be buried with release of appreciably less toxic or otherwise objectionable byproducts than petroleum-based polymers.

While the process of the invention has been described with particular reference to rice hulls, it will be recognized by those skilled in the art that the process is particularly applicable to rice hulls because of the unusually high cellulose content, inherent high silica content and low lignin content of rice hulls not found in other agricultural plant wastes or in wood products. It is to be understood, however, that while the invention has been described with particular reference to specific embodiments thereof, the forms of the invention shown and described in detail are to be taken the preferred embodiments of same and that various changes and modifications may be resorted to without departing from the spirit and scope of the invention as defined by the appended claims.

I claim:

1. The process of forming a slurry containing a cellulose product having a relatively high content of silicate cross-linked cellulose polymer comprising the steps of:
   (a) heating rice hulls under pressure in an aqueous solution containing sodium sulfite while maintaining the pH of the rice hull pulp formed at about pH 6.0 to about pH 8.0;
   (b) withdrawing the formed liquor from the rice hull pulp formed; and
   (c) heating the rice hull pulp under pressure in the presence of sodium bisulfite and sulfuric acid, thereby forming said slurry containing a cellulose product having a relatively high content of silicate cross-linked cellulose polymer.

2. The process of forming a slurry containing a cellulose product having a relatively high content of silicate cross-linked cellulose polymer comprising the steps of:
   (a) heating rice hulls under pressure in an aqueous solution containing sodium sulfite to form a slurry of liquor and rice hull pulp material broken into its basic cellular components;
   (b) withdrawing at least part of the liquor from the slurry; and
   (c) heating the remaining rice hull pulp under pressure in the presence of sodium bisulfite and sulfuric acid, thereby forming said slurry containing a cellulose product having a relatively high content of silicate cross-linked cellulose polymer.

3. The process set forth in claim 2 wherein the pH of the slurry formed while heating said rice hulls in the presence of sodium sulfite is maintained between about pH 6.0 and about pH 8.0.

4. The process of converting silica-rich plant material into useful products comprising the steps of:
   (a) heating silica-rich plant material under pressure in the presence of sodium sulfite, thereby causing said silica-rich plant material to be broken into its basic cellular components and produce a slurry; and
   (b) heating said slurry under pressure in the presence of sodium bisulfite and sulfuric acid, thereby causing hydrolysis to occur and produce thermochemically altered cellulose which forms a silicate cross-linked cellulose polymer.

5. The process set forth in claim 4 wherein the slurry formed in step (a) is maintained at a pH of about pH 6.0 and pH 8.0 while heating the silica-rich material under pressure in the presence of sodium sulfite.

6. The process set forth in claim 4 wherein said silica-rich material is rice hulls.

* * * * *

UNITED STATES PATENT AND TRADEMARK OFFICE
CERTIFICATE OF CORRECTION

PATENT NO. : 5,366,594

DATED : November 22, 1994

INVENTOR(S) : Charles Capps

It is certified that error appears in the above-identified patent and that said Letters Patent is hereby corrected as shown below:

```
In the Abstract, line 3,  "poller" should read ---polymer---
Column 3, line 9,   "C." should read ---C---
Column 3, line 67,  "C." should read ---C---
Column 4, line 65,  "besprayed" should read ---be sprayed---
Column 5, line 22,  "I claim:" should read ---What is
       claimed:---
Column 5, line 29,  "6.0" should read ---6---
Column 5, line 29,  "8.0" should read ---8---
Column 6, line 18,  "6.0" should read ---6---
Column 6, line 18,  "8.0" should read ---8---
Column 6, line 31,  "6.0" should read ---6---
Column 6, line 32,  "8.0" should read ---8---
```

Signed and Sealed this

Twenty-first Day of February, 1995

*Attest:*

BRUCE LEHMAN

*Attesting Officer*     *Commissioner of Patents and Trademarks*